Nov. 23, 1926.

C. E. JOHNSON 1,608,101

METHOD OF TREATING PISTON RINGS

Original Filed March 24, 1924

Inventor
Charles E. Johnson
By Frank E. Liuvance, Jr.
Attorney.

Patented Nov. 23, 1926.

1,608,101

UNITED STATES PATENT OFFICE.

CHARLES E. JOHNSON, OF MUSKEGON, MICHIGAN, ASSIGNOR TO THE PISTON RING COMPANY, OF MUSKEGON HEIGHTS, MICHIGAN, A CORPORATION OF MICHIGAN.

METHOD OF TREATING PISTON RINGS.

Original application filed March 24, 1924, Serial No. 701,245. Divided and this application filed February 16, 1925. Serial No. 9,465.

This invention relates to a method of treating piston rings such as are used in internal combustion or other engines particularly to make a seal against the passage of lubricating oil or exhaust gases in an internal combustion engine by the piston with which the rings are used. The present application is a division from my pending application for patent Ser. No. 701,245, filed March 24, 1924 for Piston Ring, resultin Patent No. 1,558,091, issued Oct. 22, 1925.

My invention has for one of its principal objects and purposes, the production of piston rings which can be used in engine cylinders to make particularly effective seals of the character stated, being especially effective in removing excess oil which may be on the inner walls of the cylinders in which the rings are installed, and to produce such rings by a simple and effective method, very economical to practice and very practical for the obtaining of piston rings in the large quantities which now must be made for supplying the demand made by the automotive industry. This object and many others not specifically enumerated at this time will appear, together with the novel method for attaining the same as understanding of the invention is had from the following description, taken in connection with the accompanying drawing, in which, Fig. 1 is a plan view of the ring, with parts broken away and shown in section, the method followed for cutting the oil draining slots in the ring being shown.

Like reference characters refer to like parts in the different figures of the drawing.

The piston ring 1, preferably, is made from individual ring castings machined on all sides except the inner curved side by use of any desired method of manufacture, though in practice the method which I follow is that disclosed in my Patent No. 1,405,517, issued Feb. 7, 1922, whereby a piston ring is made so that it will be a true circle when closed at its parted side. The present method forming the subject matter of this invention is directed to additional features and methods of treating the same. The piston ring is parted at one side, as at 2, the well known lap-joint parting being shown, though any other type of joint can be used quite as well in so far as the present invention is concerned.

Figure 1:
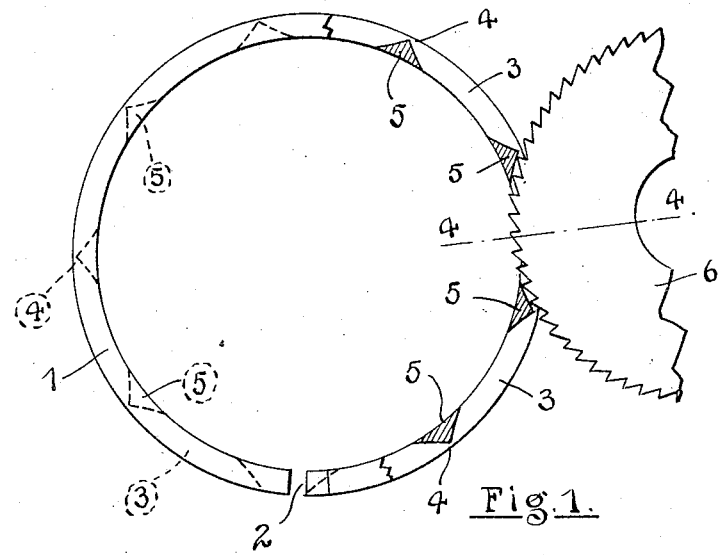
Figure 2:
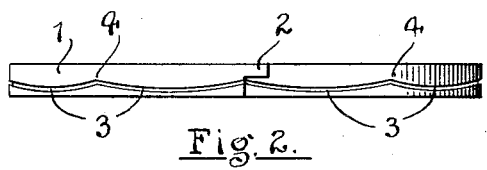
Fig. 2 is an elevation of the ring.
Figure 3:
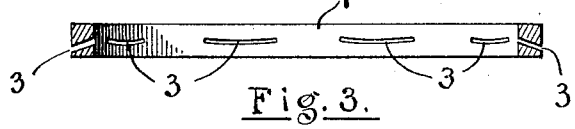
Fig. 3 is a vertical section therethrough.

With my invention rings of the character outlined are provided with slots therethrough sawed by a metal cutting saw from the outside inwardly at a plurality of spaced apart points in the periphery of the ring with the saw set at an angle to the plane of the ring whereby the slots incline upwardly and inwardly from the outer curved side to the inner curved side of the ring. The slots cut by the saw are cut in consecutive order around the ring and, preferably, one saw cut or slot at its ends overlaps the ends of the adjacent slots 3, as indicated at 4, thereby making a continuous groove of varying depth around the ring which, at regular spaced intervals, extends through the ring to the inner side, the slots on said inner side being shorter than at the outer side, there being substantially triangular sections 5 between adjacent slots 3, as shown in Fig. 1. This follows from the circular shape of the saw 6 and the circular shape of the ring with which it is used.

Figure 4:
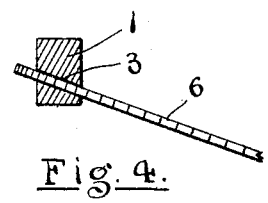
Fig. 4 is a somewhat enlarged section through a side of the ring, showing the manner in which the slots are cut therein, and the approximate angle of the cutting saw with respect to the plane of the ring.

The saw, preferably, is located at an angle to the plane of the ring, as shown in Fig. 4, the slots 3 cut curving upwardly at each end from the middle point of each slot, the groove around the ring comprising a connected series of scallops. Also the slots 3 cut in the ring extend upwardly and inwardly at an angle to the horizontal, and the edge between the upper side of each slot and the outer curved side of the ring is made more sharp due to the acute angle between said side of the slot and the outer curved side of the ring. It is evident that the slots may be cut so that the adjacent ends thereof do not meet and overlap, as shown in my pending application Ser. No. 714,256, filed May 19, 1924 in accordance with this method of making the rings. It is also clear that the slots do not need to be cut singly and in consecutive order around the ring, it being possible to use a number of saws in a gang for cutting the slots, particularly if the ends of the slots do not meet and overlap, and my invention comprehends such use and is not to be considered as restricted to the specific disclosure made in these respects.

Figures 5, 6:
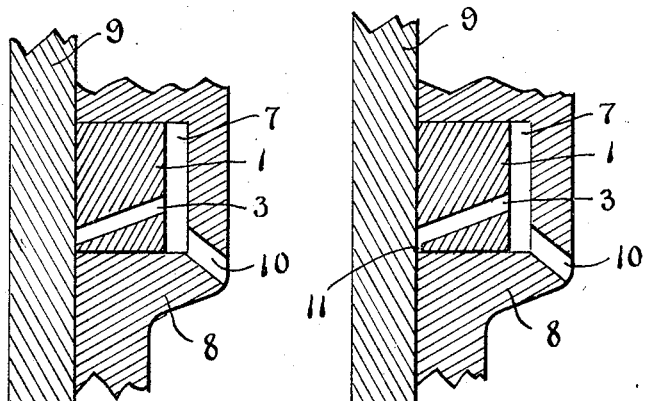
Fig. 5 is a fragmentary enlarged vertical section through a wall of an engine cylinder and adjacent parts of a piston and ring carried thereby.
Fig. 6 is a view similar to Fig. 5, showing a slightly different form of ring construction made by the same method.

The rings are designed to be placed in ring grooves, indicated at 7 in Figs. 5 and 6, which are formed in pistons 8, so that the outer curved sides of the rings will bear against the inner sides of the cylinder walls 9 of an internal combustion or other engine. As the piston moves up and down in the cylinder, the oil which may be adhering to the walls of the cylinder is scraped therefrom and passes inwardly through the slots 3 to the ring grooves 7 back of the rings, being drained therefrom through outlet openings 10 made through the piston from the ring grooves to the inner sides of said piston.

It is evident that this method of treating piston rings is very simple and effective, the slots being readily sawed through the ring and forming slots of scalloped form at their outer ends which in conjunction with the upward and inward inclination of said slots makes not only an acute scraping edge, but also accomplishes a shearing action in addition to the scraping action in removing the excess of oil from the cylinder walls. In the slightly modified or different construction shown in Fig. 6, a small portion of the metal of the ring is removed below the lower side of each of the slots 3, as indicated at 11, this aiding the oil scraping action by providing a larger space in which the oil may be collected and at the same time providing a more complete seal against the passage of exhaust gases or the compressed fuel and air mixture by the piston. The invention is very practical and commercially valuable and is used extensively in the production of piston rings. Said invention is defined in the appended claims and is to be considered as comprehensive of all variations from the specific disclosure falling within and comprehended by said claims.

I claim:

1. The method of treating piston rings which consists in sawing with a circular saw into and through a substantially circular piston ring from the outer curved side thereof inwardly and at a plurality of spaced apart places in the length of the ring, and with the saw inclined to the plane of the ring.

2. The method of treating piston rings which consists in cutting a plurality of slots in a ring with a circular cutting member, said cutting member feeding into the ring from the outside inward and through the ring, said cutting member being located at an angle to the plane of the ring.

3. The method of treating piston rings which consists in sawing a plurality of slots from the outer curved side of a ring and through the ring to the inner curved side thereof, said slots having their ends at the outer side of the ring joining, the saw being positioned at an angle to the plane of the ring during the sawing operation.

4. The method of treating piston rings which consists in cutting through, and inwardly from the outer curved side of a substantially circular ring, a slot with circularly arcuate ends and flat sides inclined to the parallel sides of the ring.

5. The method of treating piston rings which consists in cutting through, and inwardly from the outer curved side of a substantially circular ring, a circumferentially extending series of slots with circularly arcuate inner and outer ends and flat sides inclined to the parallel sides of the ring.

6. The method of treating piston rings which consists in cutting through, and inwardly from the outer curved side of a substantially circular ring, a circumferentially extending series of slots communicating at said side of the ring and having circularly arcuate ends and flat sides inclined to the parallel sides of the ring.

In testimony whereof I affix my signature.

CHARLES E. JOHNSON.